United States Patent [19]

Sigouin

[11] Patent Number: 4,727,916
[45] Date of Patent: Mar. 1, 1988

[54] TREE HARVESTER

[76] Inventor: Roger Sigouin, 601 route 111 ouest, Amos, Quebec, Canada, J9J 2Y1

[21] Appl. No.: 894,611

[22] Filed: Aug. 8, 1986

[51] Int. Cl.⁴ ............................................. A01G 23/08
[52] U.S. Cl. ................................. 144/3 D; 144/34 R
[58] Field of Search .................... 144/2 Z, 3 D, 34 R, 144/336, 335

[56] References Cited

U.S. PATENT DOCUMENTS

| 3,468,352 | 9/1969 | Larson et al. | 144/34 E |
| 3,595,288 | 7/1971 | Landers. | |
| 3,659,635 | 5/1972 | Mellgren. | |
| 3,805,860 | 4/1974 | Smith | 144/3 D |
| 3,875,983 | 4/1975 | Kurelek | 144/3 D |
| 3,902,530 | 9/1975 | Muirhead | 144/34 R |
| 3,911,981 | 10/1975 | Tucek | 144/3 D |
| 3,986,542 | 10/1976 | Guy et al. . | |
| 4,540,035 | 9/1985 | Wehr et al. | 144/34 R |

FOREIGN PATENT DOCUMENTS 440992  4/1947 Canada .
1029283 4/1978 Canada .

Primary Examiner—W. Donald Bray
Attorney, Agent, or Firm—Robic, Robic & Associates

[57] ABSTRACT

A tree harvester comprises a head boom at the lower free end of which is mounted a tree felling head having a cylindrical cutting knife behind which is formed a storage area for felled trees. The head includes pivotable gripping arms for pressing the trees to be felled against the cylindrical knife and for driving them and holding them in the storage area.

12 Claims, 5 Drawing Figures 4,727,916

TREE HARVESTER

FIELD OF THE INVENTION

The present invention relates to an improved tree harvester and more specifically to a tree harvester including a new cutting head for felling trees by cutting a groove through their butt ends.

DESCRIPTION OF THE PRIOR ART

One known type of cutting head is disclosed in U.S. Pat. No. 3,986,542 of Oct. 19, 1976 and involves the use of a pair of shearing blades, adapted to close in around the tree trunk, from both sides of the base or butt end. The power required to achieve the necessary slit, that will cause felling of the tree, is of course quite high, particularly where the butt end is large. The mechanical apparatus necessary to move the shears through the tree is also complex and thus expensive and high in maintenance costs. Another type of harvester using a shear blade is disclosed in U.S. Pat. No. 3,595,288 of July 27, 1971. It also requires much power and the operating costs are high.

In numerous other types of tree harvesters, felling is obtained by making a kerf through the base with an essentially flat large circular saw, as in U.S. Pat. No. 3,659,635 of May 2, 1972; Canadian Pat. No. 440,992 of Apr. 29, 1947 and Canadian Pat. No. 1,029,283 of Apr. 11, 1978. While the use of a saw requires less operating power and is simpler in construction, the saw itself is a problem because of its bulk and relative frailness resulting from a high diameter to thickness ratio. They must consequently be handled with care both when mounting them on the harvester and when using them as the major portion overhangs its support. They are also costly.

SUMMARY OF THE INVENTION

The present invention avoids the above disadvantages by using a cutting tool which is a cylindrical and elongated rotary body formed with cutting teeth or edges. Preferably, these teeth or edges extend parallel to the rotation axis. A cutting tool of this type can be made much sturdier by having an appropriate body diameter. It can be mounted on the head boom more firmly and easily than in the case of circular saws and by means of a simpler structure. The required power is no greater than that required for circular saws.

More specifically, the invention lies in the provision of a tree harvester comprising a head boom at the lower end of which is mounted a tree felling head including a cylindrical cutting knife mounted for rotation about its longitudinal axis.

Means are provided for mounting the tree felling head at the lower end of the head boom for holding this head with its cutting knife in essentially horizontal position and against one side of a butt end of a tree to be felled. Additionally, the tree felling head includes gripping arms that can be pivoted to close in around the butt end of the tree to be felled and on the side thereof opposite the side on which the cutting knife is applied. In this manner, the gripping arms press the butt end of the tree against the rotary cutting knife and cuts a groove through its butt end for felling the tree. The head also includes wall means located behind the cutting knife with respect to the tree to be felled, such wall means defining a storage area for felled trees. The gripping arms and the wall means are constructed to allow the arms to move the felled tree bodily in the storage area and in vertical position. Advantageously, at least one additional gripping arm may be provided which is suitable to hold the stored trees in the storage area while other trees are being felled.

A description now follows of a preferred embodiment of the invention having reference to the appended drawing.

DESCRIPTION OF A PREFERRED EMBODIMENT OF THE INVENTION

Figure 5:
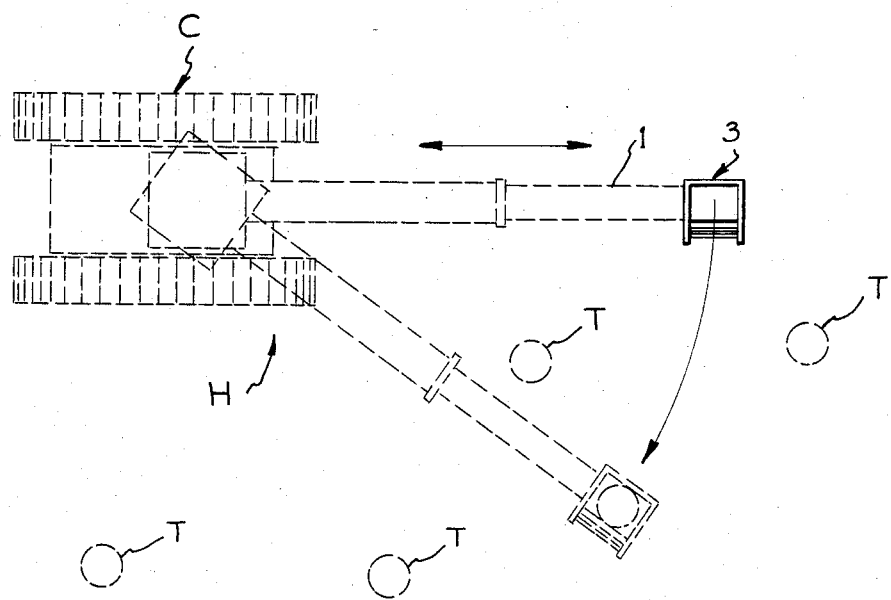
FIG. 5 is a diagrammatic top plan view of a tree harvester according to the invention in use for felling a plurality of trees.

The illustrated tree harvester H (see FIG. 5) made according to the invention, includes a head boom 1 of which only the lower end is shown. Pivotally mounted at the lower end of the boom 1 is tree felling head 3 which includes a cylindrical knife 5, to be fully described hereinafter. The knife 5 has a longitudinal axis 7 and a hydraulic power assembly 9 is provided in the head 3 for rotating the knife 5 about its axis 7. The head 3 is pivoted to the boom 1 so that the cutting head 5 may be brought in essentially horizontal position whereby it can be placed against one side of a butt end of a tree (not shown) to be felled.

Figure 3:
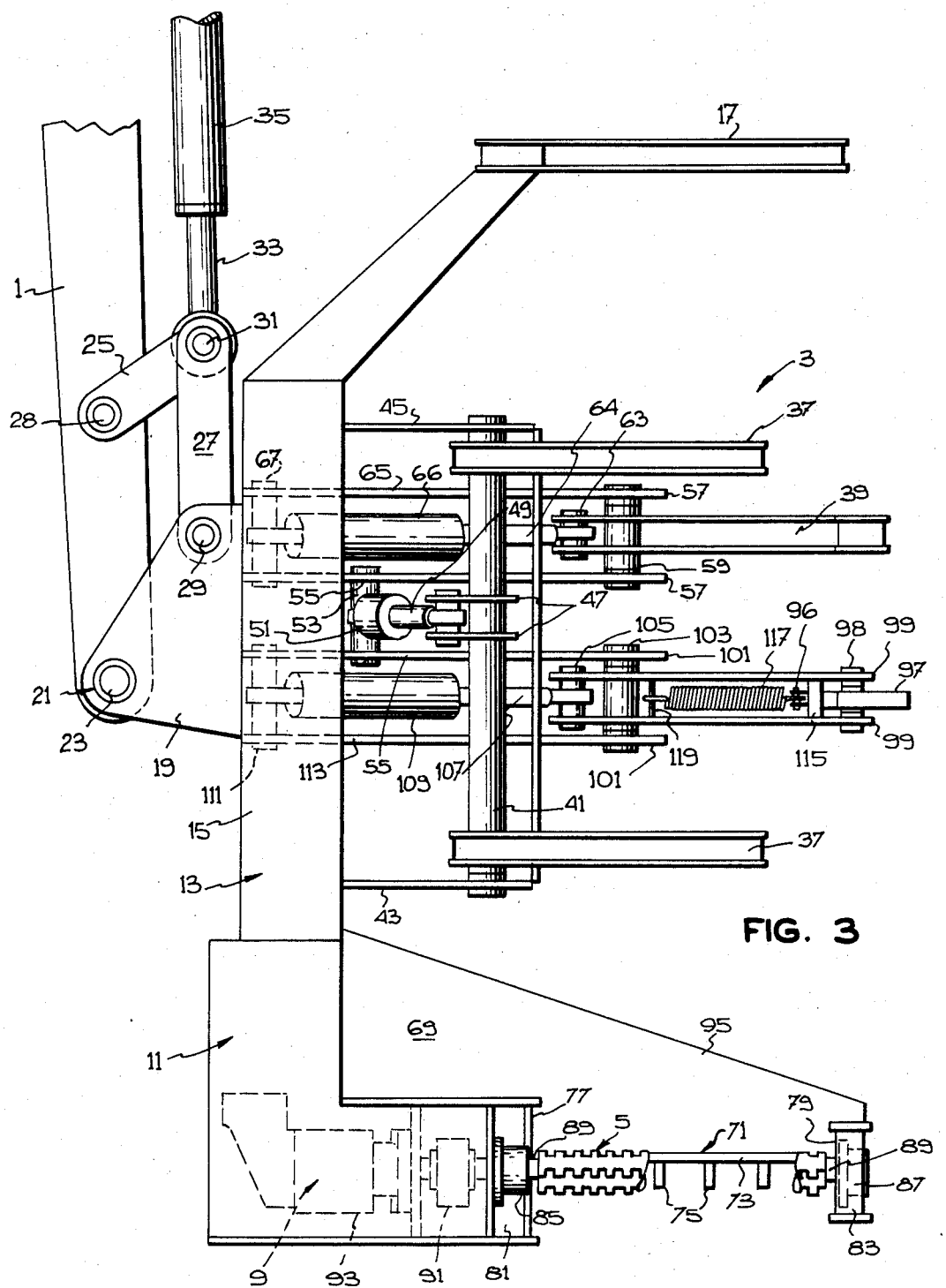
FIG. 3 is a side elevation view, with the cutting knife partly cut away, of the assembly shown in FIG. 1.

The head 1 has a platform structure 11 from a corner of which upstands a columnar structure 13 including a generally hollow post 15 terminating at the upper end by a triangular inclined tree resting support 17. Projecting laterally of the post 15, are a pair of spaced brackets 19, edgedly secured thereto, between which plates 19 and at the outward end thereof is a shaft mount 21 including a pivot 23 serving for pivotally mounting the lower end of the head boom 1 to the spaced brackets 19. Two pairs of links 25, 27, have their distant ends pivotally connected to pivot mounts 28, 29, the former being mounted on the head boom 1 while the latter is mounted between the bracket plates 19. The common ends of the links 25, 27, are, in turn, pivotally interconnected by a shaft 31 of a further shaft mount. A rod 33 of a hydraulic power cylinder 35 has its free end fixed to the shaft 31. It will thus be appreciated that with the head boom 1 held stationary, actuation of cylinder 35 causes pivotal movement of the tree felling head 3 about the pivot 23 at the lower end of the boom 1 and thus angular displacement of the cutting knife 5 which may then be shifted to horizontal position, as shown in FIG. 3, to be applied to and transversely of the butt end of a tree to be felled.

With the cutting knife 5 resting against one side of the tree butt end, clamping means are provided which include first arcuate pivotably gripping arms 37, 39, located above the knife 5 and capable of closing in around the butt end of the tree on the side thereof opposite that against which the knife 5 is applied. With closing pressure applied on the gripping arms 37, 39, the tree trunk is thus brought forcibly against the rotating knife 5 which cuts a groove therethrough until the tree is severed at the base.

The first arcuate gripping arms 37 have one end secured to a common shaft 41 of which the ends are pivoted to two vertically spaced bracket plates 43, 45, edgedly secured as by welding to the post 15. A pair of flat links 47 have one end secured to this shaft 41 while the other end is pivoted to the free end of a rod 49 of a hydraulic power cylinder 51, the other end of the cylinder 51 being secured to a pin 53 which is itself pivoted to two spaced braket plates 55 again edgedly fast with the post 15. It will thus be realized that operation of the power cylinder 51 causes common pivotal movement of the first gripping arms 37 about the axis of their common shaft 41.

Figure 1:
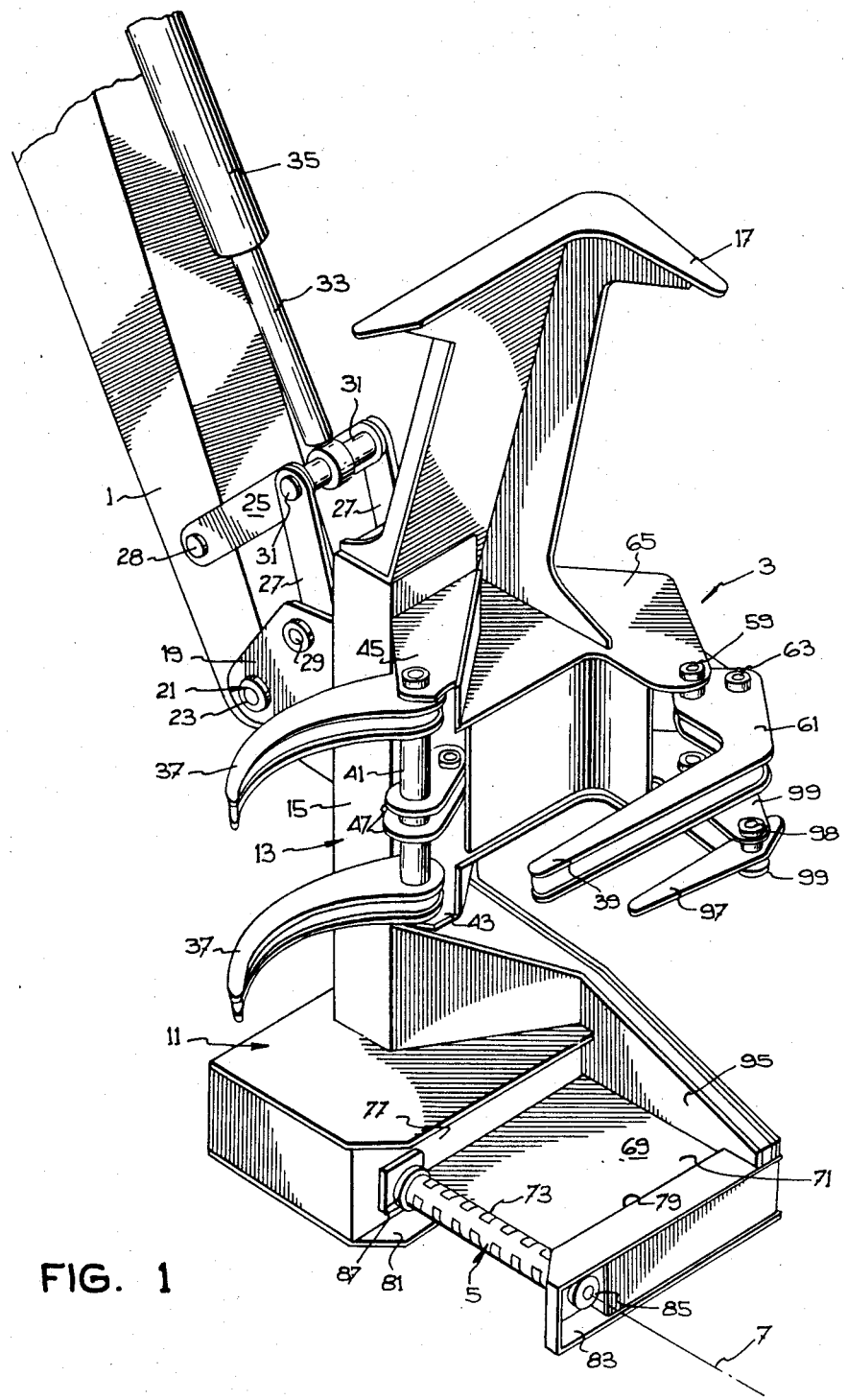
FIG. 1 is a perspective view illustrating part of a head boom at the lower en of which is mounted a tree felling head, according to the invention.
Figure 2:
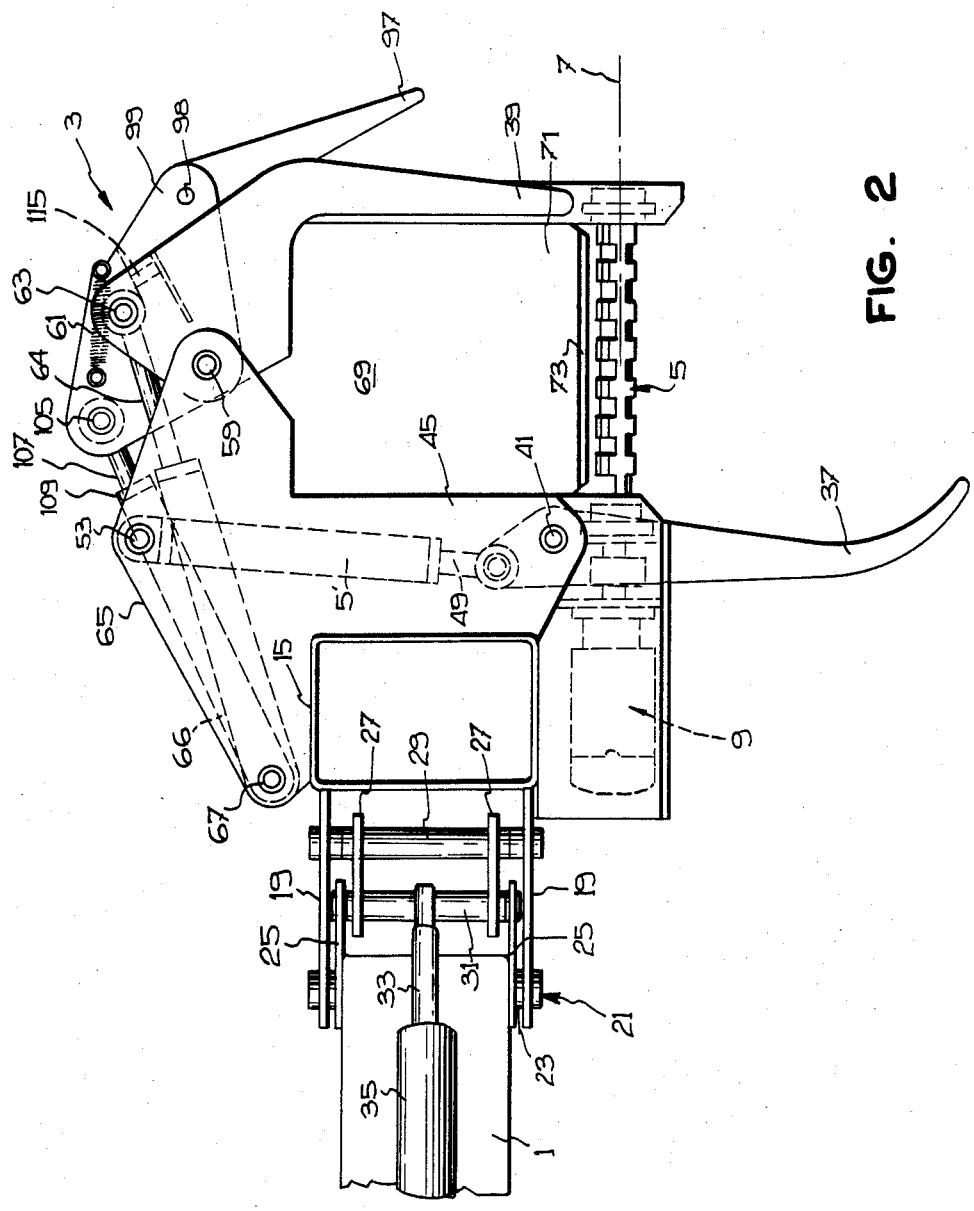
FIG. 2 is a plan view of the tree felling head and the lower end of the head boom.

The aforesaid clamping means includes another first gripping arm 39 which is similarly mounted but preferably actuated independently of the other first gripping arms 37. Gripping arm 39 is located opposite arms 37 with respect to the post 15 and also between them as clearly shown in FIGS. 1 and 3. Arm 39 is L-shaped, with one end pivoted to two spaced bracket plates 57 through a shaft 59. The pivoted end of arm 39 defines a bulge 61 pivoted, through a pin 63, to the free end of a rod 64 of a hydraulic power cylinder 66 of which the other end is pivoted to a bracket plate 65 as well as to the upper one of the two bracket plates 55, respectively, through a pin 67. Actuation of the hydraulic power jack 66 thus brings pivotal movement of the first arm 39 about the shaft 59. In this manner, the first arms 37 and 39 are capable of gripping a tree, at the base, to force it against the rotating knife 5.

The platform structure 11 of the head 3 comprises wall means behind the knife 5, with respect to the tree to be felled, the wall means defining a storage area 69 for trees that have already been felled.

This wall means includes a flat bottom wall 71 of which the straight frontal edge 73 extends parallel to the axis 7 of the cutting knife 5. This bottom wall 71 may project essentially radially of the knife 5 but it may advantageously have the structure shown at the bottom of FIG. 3 where it stands slightly below the top peripheral edge of the knife 5, being strengthened by transverse metal straight struts 75. It will be noted that the total depth defined by the thickness of the bottom wall 71 and by the width of the struts 75 does not exceed the diameter of the knife. Important however is that the surface of the bottom wall 71 does not exceed the top peripheral edge of the knife 5 to prevent hooking of the end of a cut tree as the latter is moved over into the area 69.

The wall means of the platform structure 11 further includes side wall portions 77, 79, having hollow ends 81, 83, projecting past the frontal edge 73. Suitable bearings 85, 87, are mounted in the hollow ends 81, 83, into which the free ends of the shaft 89 of the knife 5 are journalled. The leftward end of the shaft 89 extends further away from the cutting knife 5 and is operatively coupled to a speed reducer 91 connected, in turn, to a hydraulic motor 93. At their ends away from the cutting knife 5, the side walls 77, 79, are connected by a transverse wall 95 upstanding from the bottom wall 71. Walls 71, 77 and 79 thus define the felled tree storage area 69. The felled trees are drawn into the storage area 69 by the first clamping arms 37, 39, and are held vertically in that area during felling of further trees until the area is filled, at which time the head 3 is transported by the head boom 1 over an attending truck or other vehicle for the felled trees to be unloaded.

For the purpose of holding felled trees in the storage area 69, the clamping means aforesaid further comprise at least one second gripping arm 97. This arm 97 has one end pivoted at 98 between the ends of two spaced actuating levers 99 of which the other ends are pivotally mounted, through a shaft 103, to two spaced plates 101 edgedly secured to the post 15. The levers 99 then extend past the shaft 103 and their free ends are pivotally mounted on a pin 105 which is fixed at the free end of a rod 107 of a hydraulic power cylinder 109. The other end of the cylinder 109 is pivotally mounted, by means of a transverse pin 111, on two spaced brackets, one of which is the previously mentioned bracket 55 while the other is a bracket 113 parallel thereto and likewise edgedly secured to the post 15. As shown in FIG. 3, the second arm 97 has a portion 96 extending past the pivot 98. The free end of this portion 96 is drawn against an abutment element 115, fixed to and between the two actuating levers 99, by a coil spring 117 connected at one end to this free end of portion 96 and connected, at the other end, to a short stud 119 which if fixed to and between the levers 99.

Once one or more felled trees has been brought vertically into the storage area 69 by the first gripping arms 37, 39, the actuating levers 99 are rotated clockwise (FIG. 1) to force the short second arm 97 against the tree to hold it in position on the walls 77, 95, and the resting support 17, the action being enhanced by the force of the coil spring 117. Whenever a new tree is brought into the storage area 69, the second gripping arm 97 is gradually moved away by counterclockwise rotation of the levers 97 thereby loosening the action of the spring 117 and allowing the first gripping arms 37, 39, to bring the new tree against the other trees that are already in the area 69. Once the new tree abuts the others in the area, the second arm 97 is again brought into action with the force of the coil spring 117 holding all trees in vertical storage position. This particular holding allows the tree harvester H to fell and store a plurality of trees T (See FIG. 5) from a stationnary position. Indeed, the operator only has to rotate and adjust the length of the boom 1 to "pick up" the tree T all around the carrier C.

Figure 4:
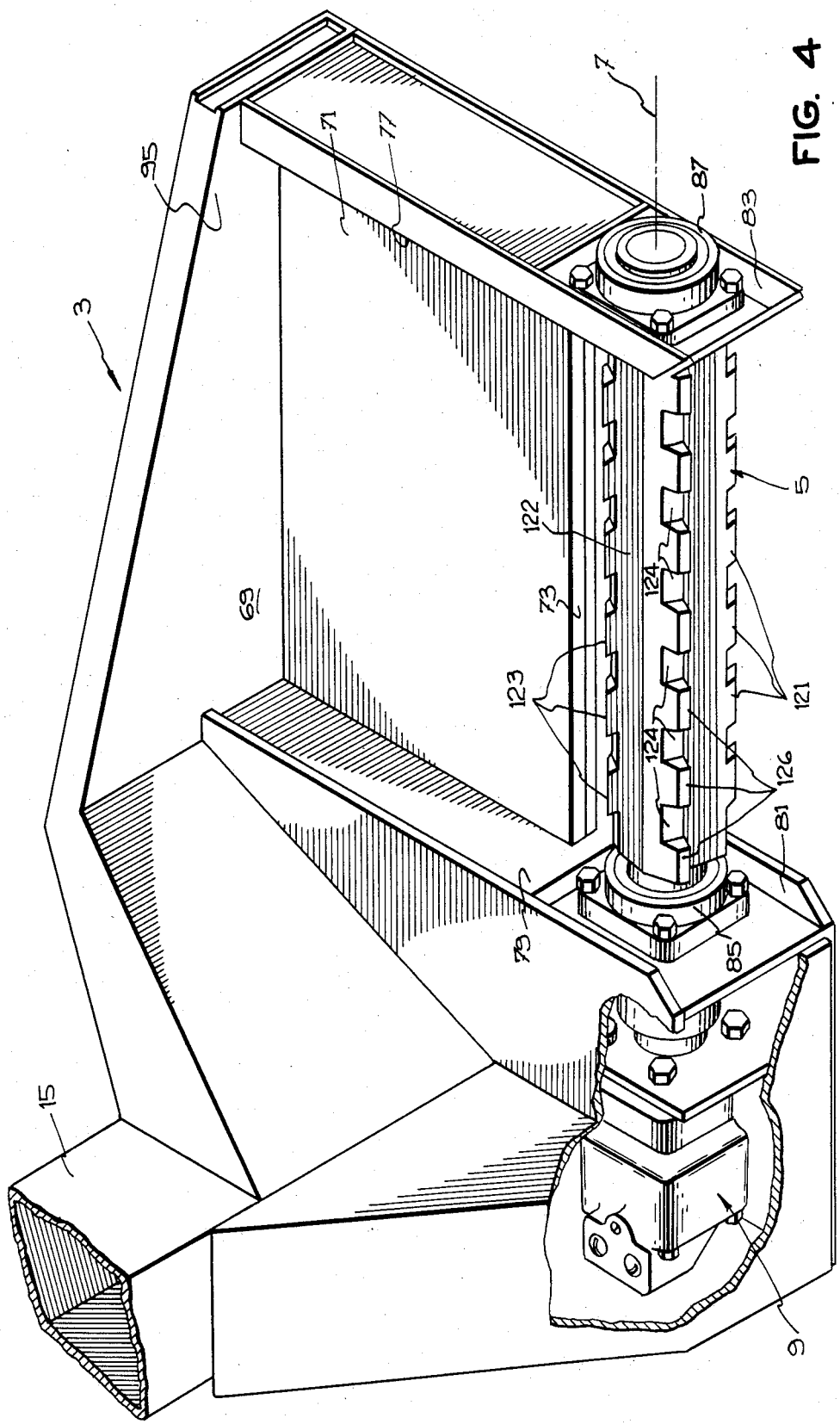
FIG. 4 is a perspective view of the tree felling head alone.

In the preferred form particularly illustrated in FIG. 4, the cutting knife 5 comprises a solid cylindrical body at the periphery of which are formed a plurality of rows 121 of spaced cutting teeth 123 aligned lengthwise of the knife 5; all rows 121 extending parallel to the rotation axis 7 and being evenly spaced around the periphery of the cylindrical knife body. As shown also, the cutting teeth 123 in each row may be staggered with respect to the teeth of adjacent rows, lengthwise of the cutting knife. The cutting teeth 123 may be defined, at the tips of successive longitudinal grooves 122 evenly spaced around the knife 5, by peripheral notches 124; the cutting edges of the teeth 123 being obtained by machining small slightly radially inclined bevels 126. It will however readily come to the mind of those skilled in the art that other types of cutting knife can be used, provided they are of the elongated cylindrical type rotatable about their longitudinal axis.

I claim:
1. A tree harvester comprising:
a head boom having a lower free end;

a tree felling head comprising an elongated post having a longitudinal axis and a platform structure fixedly mounted at one end of said post and extending laterally therefrom; said platform structure defining a storage enclosure including a flat bottom wall having a straight front edge and a circumscribing wall upstanding from and around said bottom wall, said circumscribing wall extending at least up to the ends of said straight front edge;

a rotary cylindrical cutting knife and means solidly mounting said knife on said platform structure immediately adjacent and parallel to said bottom wall front edge outside said storage enclosure, said cylindrical knife having a top longitudinal edge essentially flush with the top face of said bottom wall;

means pivotally mounting said post on said lower end of said head boom for holding said tree felling head with said rotary cutting knife in essentially horizontal position and applied against one side of a butt end of a tree to be felled;

first gripping arm means comprising at least one first gripping arm above said storage enclosure and adjacent thereto; means mounting one end of said first arm on said tree felling head for pivotal movement of said first arm about an axis parallel to said post longitudinal axis, and first power means for pivoting said first gripping arm along an arc of circle of sufficient length to allow said first arm to close in around the other side of said butt end to the tree to be felled whereby to press said rotary cutting knife against the tree butt end to cut a kerf thereacross and thereafter to move said tree into said storage enclosure in vertical position against said circumscribing wall.

a tree support fixed to said post above at least part of said circumscribing wall for holding said cut tree in said vertical position; and second gripping arm means beneath said tree support for releasably holding said felled tree in said storage enclosure while a further tree is being felled, wherein said second gripping arm means is independent of said first gripping arm means and comprises:

a lever, first pivot means mounting said lever on said post for pivotal movement about an axis parallel to said post longitudinal axis; second pivot means on said lever, away from said first pivot means, and a power jack connected respectively to said second pivot means and to said post for pivoting said lever about said first pivot means; a second gripping arm having a tree gripping end and an operating end; a third pivot means on said lever, away from said first and second pivot means and mounting said second gripping arm on said lever between said tree gripping end and said operating end for pivotal movement thereof about an axis parallel to said post longitudinal axis; and biassing means joining said lever and said operating end for applying biassing pressure to said felled tree as said lever is pivotally drawn toward said felled tree in said storage enclosure.

2. A tree harvester a head boom having a lower free end;

a tree felling head comprising an elongated post having a longitudinal axis and a platform structure fixedly mounted at one end of said post and extending laterally therefrom; said platform structure defining a storage enclosure including a flat bottom wall having a straight front edge and a circumscribing wall upstanding from and around said bottom wall, said circumscribing wall extending at least up to the ends of said straight front edge;

a rotary cylindrical cutting knife and means solidly mounting said knife on said platform structure immediately adjacent and parallel to said bottom wall front edge outside said storage enclosure, said cylindrical knife having a top longitudinal edge essentially flush with the top face of said bottom wall;

means pivotally mounting said post on said lower end of said head boom for holding said tree felling head with said rotary cutting knife in essentially horizontal position and applied against one side of a butt end of a tree to be felled;

first gripping arm means comprising at least one first gripping arm above said storage enclosure and adjacent thereto; means mounting one end of said first arm on said tree felling head for pivotal movement of said first arm on said tree felling head for pivotal movement of said first arm about an axis parallel to said post longitudinal axis, and first power means for pivoting said first gripping arm along an arc of circle of sufficient length to allow said first arm to close in around the other side of said butt end to the tree to be felled whereby to press said rotary cutting knife against the tree butt end to cut a kerf thereacross and thereafter to move said tree into said storage enclosure in vertical position against said circumscribing wall, wherein said first gripping arm means comprise two spaced first gripping arms, on one side of said post longitudinal axis;

wherein said first power means comprise a single power jack pivoting said two arms in unison;

wherein said first gripping arm means additionally comprise at least one further first gripping arm located on the other side of said post longitudinal axis between said two spaced first gripping arms on said one side whereby to embrace a tree to be cut from two opposite sides thereof; and wherein said first power means comprise a further power jack pivoting said further first gripping arm.

3. A tree harvester as claimed in claim 2, further comprising second gripping arm means located on said other side of said post longitudinal axis and between said two spaced first gripping arms on said one side of said post longitudinal axis, for releasably holding a felled tree in said storage enclosure while a further tree is being felled.

4. A tree harvester as claimed in claim 3, wherein said second gripping arm means are located between said further first gripping arm and said storage enclosure.

5. A tree harvester as claimed in claim 2, wherein said bottom wall is rectangular and said straight front edge extends fully along one side thereof.

6. A tree harvester as claimed in claim 3, wherein said second gripping arm means is independent of said first gripping arm means and comprises:

a lever, first pivot means mounting said lever on said post for pivotal movement about an axis parallel to said post longitudinal axis;

second pivot means on said lever, away from said first pivot means;

a power jack connected respectively to said second pivot means and to said post for pivoting said lever about said first pivot means;

a second gripping arm having a tree gripping end and an operating end;

a third pivot means on said lever, away from said first and second pivot means and mounting said second gripping arm on said lever between said tree gripping end and said operating end for pivotal movement thereof about an axis parallel to said post longitudinal axis; and biassing means joining said lever and said operating end for applying biassing pressure to said felled tree as said lever is pivotally drawn toward said felled tree in said storage enclosure.

7. A tree harvester as claimed in claim 6, further comprising a tree support fixed to said post above at least part of said circumscribing wall for holding said cut tree in said vertical position.

8. A tree harvester as claimed in claim 2, wherein said cylindrical cutting knife comprises a plurality of rows of aligned cutting teeth, said rows extending parallel to said rotation axis and being evenly spaced around said cylindrical cutting knife.

9. A tree harvester as claimed in claim 8, wherein the teeth of each of said rows are staggered with the teeth of adjacent rows, lengthwise of said cutting knife.

10. A tree harvester as claimed in claim 2, wherein said flat bottom wall has a thickness not exceeding the diameter of said cylindrical cutting knife.

11. A tree harvester as claimed in claim 2, wherein said circumscribing wall includes two sidewalls having ends projecting forwardly of said bottom wall frontal edge, and said knife mounting means comprise bearing means in said side wall projecting ends into which the ends of said cylindrical cutting knife are mounted.

12. A tree harvester as claimed in claim 11, comprising cutting knife power means operatively connected to one of said ends of said knife.

* * * * *